(12) United States Patent
Xiong et al.

(10) Patent No.: US 11,757,515 B2
(45) Date of Patent: *Sep. 12, 2023

(54) SIZE DETERMINATION FOR CHANNEL STATE INFORMATION (CSI) PART ONE AND PART TWO TRANSMISSION OF CSI REPORT

(71) Applicant: Apple Inc., Cupertino, CA (US)

(72) Inventors: Gang Xiong, Beaverton, OR (US); Yushu Zhang, Beijing (CN); Ajit Nimbalker, Fremont, CA (US); Joonyoung Cho, Santa Clara, CA (US); Lopamudra Kundu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,494

(22) Filed: Jul. 20, 2022

(65) Prior Publication Data

US 2022/0368390 A1 Nov. 17, 2022

Related U.S. Application Data

(63) Continuation of application No. 16/890,558, filed on Jun. 2, 2020, now Pat. No. 11,411,701, which is a
(Continued)

(51) Int. Cl.
*H04L 5/00* (2006.01)
*H04B 7/06* (2006.01)
(Continued)

(52) U.S. Cl.
CPC ............ *H04B 7/063* (2013.01); *H04B 7/0486* (2013.01); *H04B 7/0632* (2013.01); *H04L 5/0048* (2013.01); *H04L 5/0055* (2013.01); *H04L 5/0057* (2013.01); *H04L 27/2601* (2013.01); *H04L 69/324* (2013.01);
(Continued)

(58) Field of Classification Search
CPC ... H04L 5/0048; H04L 69/324; H04L 1/1812; H04L 27/2601; H04B 7/0632; H04B 7/0486
See application file for complete search history.

(56) References Cited

U.S. PATENT DOCUMENTS

| 10,680,774 | B2 | 6/2020 | Xiong et al. | |
| 11,411,701 | B2* | 8/2022 | Xiong | H04B 7/063 |
| 2018/0241453 | A1* | 8/2018 | Lee | H04L 1/0028 |

* cited by examiner

*Primary Examiner* — Jamal Javaid
(74) *Attorney, Agent, or Firm* — Kowert, Hood, Munyon, Rankin & Goetzel, P.C.

(57) ABSTRACT

Embodiments of a User Equipment (UE), Next Generation Node-B (gNB) and methods of communication are generally described herein. A channel state information (CSI) report may include a CSI part 1 transmission and may be configurable to include a CSI part 2 transmission. The UE may determine a first number of coded modulation symbols per layer to be used for the CSI part 1 transmission on a physical uplink shared channel (PUSCH) without uplink shared channel (UL-SCH) data. The first number of coded modulation symbols per layer may be determined as: a minimum of a first term and a second term if the CSI report includes the CSI part 2 transmission; and the second term if the CSI report does not include the CSI part 2 transmission.

20 Claims, 10 Drawing Sheets

Related U.S. Application Data continuation of application No. 16/243,887, filed on Jan. 9, 2019, now Pat. No. 10,680,774.

(60) Provisional application No. 62/617,131, filed on Jan. 12, 2018, provisional application No. 62/710,326, filed on Feb. 16, 2018.

(51) Int. Cl.
| | |
|---|---|
| *H04L 69/324* | (2022.01) |
| *H04L 27/26* | (2006.01) |
| *H04B 7/0456* | (2017.01) |
| *H04L 1/1812* | (2023.01) |
| *H04W 88/02* | (2009.01) |

(52) U.S. Cl.
CPC .......... *H04L 1/1812* (2013.01); *H04L 5/0091* (2013.01); *H04L 27/2602* (2013.01); *H04W 88/02* (2013.01)

SIZE DETERMINATION FOR CHANNEL STATE INFORMATION (CSI) PART ONE AND PART TWO TRANSMISSION OF CSI REPORT

PRIORITY CLAIM

This application is a continuation of U.S. patent application Ser. No. 16/890,558, entitled "SIZE DETERMINATION FOR CHANNEL STATE INFORMATION (CSI) PART ONE AND PART TWO TRANSMISSION OF CSI REPORT", filed Jun. 2, 2020, which is a continuation of U.S. patent application Ser. No. 16/243,887, entitled "SIZE DETERMINATION FOR CHANNEL STATE INFORMATION (CSI) PART ONE AND PART TWO TRANSMISSION OF CSI REPORT", filed Jan. 9, 2019, now U.S. Pat. No. 10,680,774, issued Jun. 9, 2020, which claims the benefit of priority under 35 U.S.C. 119(e) to U.S. Provisional Patent Application Ser. No. 62/617,131, filed Jan. 12, 2018, and to U.S. Provisional Patent Application Ser. No. 62/710,326, filed Feb. 16, 2018, all of which are incorporated by reference in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to wireless networks. Some embodiments relate to cellular communication networks including 3GPP (Third Generation Partnership Project) networks, 3GPP LTE (Long Term Evolution) networks, 3GPP LTE-A (LTE Advanced) networks, New Radio (NR) networks, and 5G networks, although the scope of the embodiments is not limited in this respect. Some embodiments relate to channel state information (CSI), including CSI reports.

BACKGROUND

Base stations and mobile devices operating in a cellular network may exchange data. As demand for mobile services and high data rates increases, various challenges related to reliability and capacity may arise. In an example scenario, a large number of users may demand access to the network. In another example scenario, performance requirements may be more demanding for new systems and/or new applications in comparison to legacy systems and/or legacy applications. Various techniques may be used in these and other scenarios, including exchanging of control information and/or performance information between the base stations and mobile devices. Accordingly, there is a general need for such techniques in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
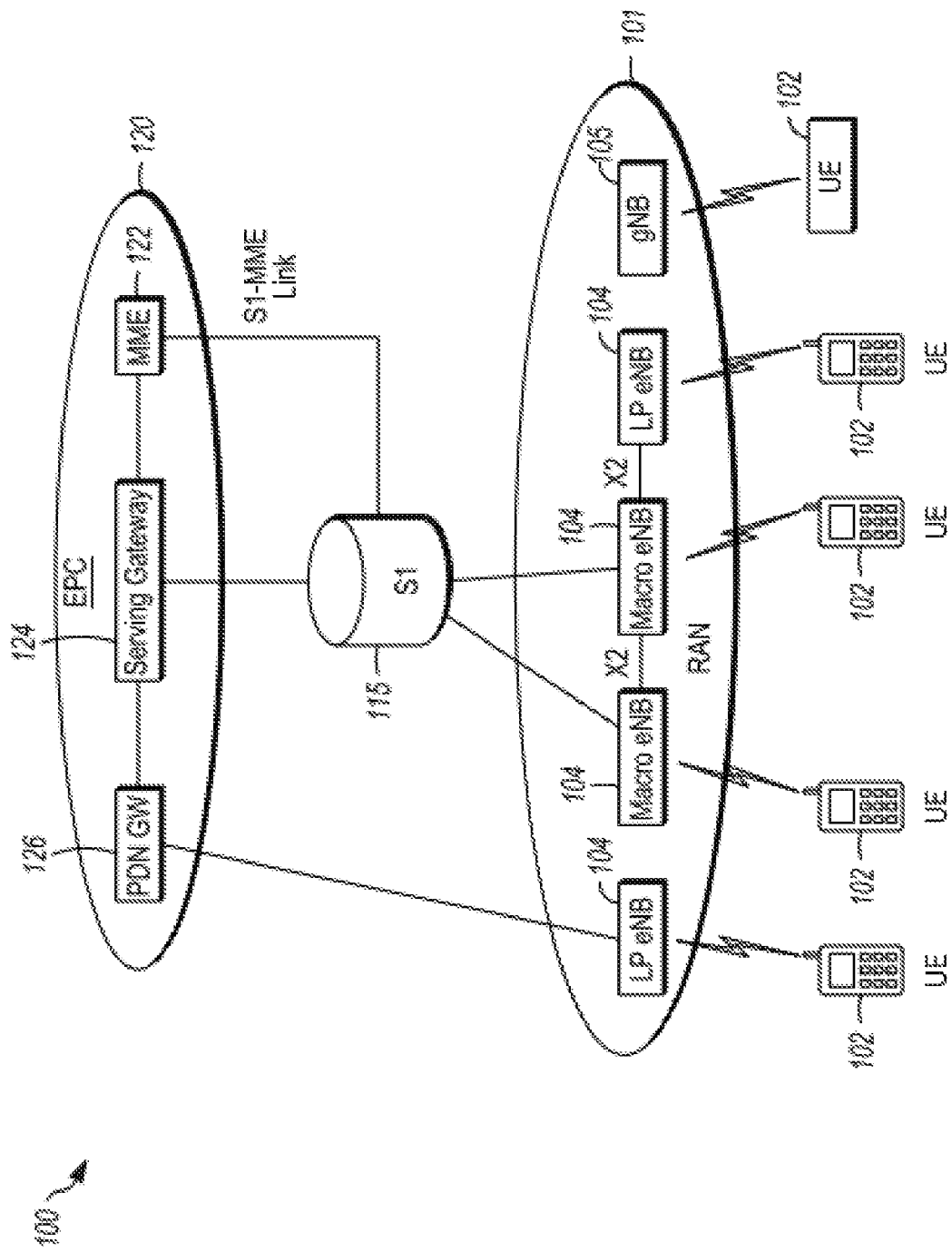
FIG. 1A is a functional diagram of an example network in accordance with some embodiments.
Figure 1B:
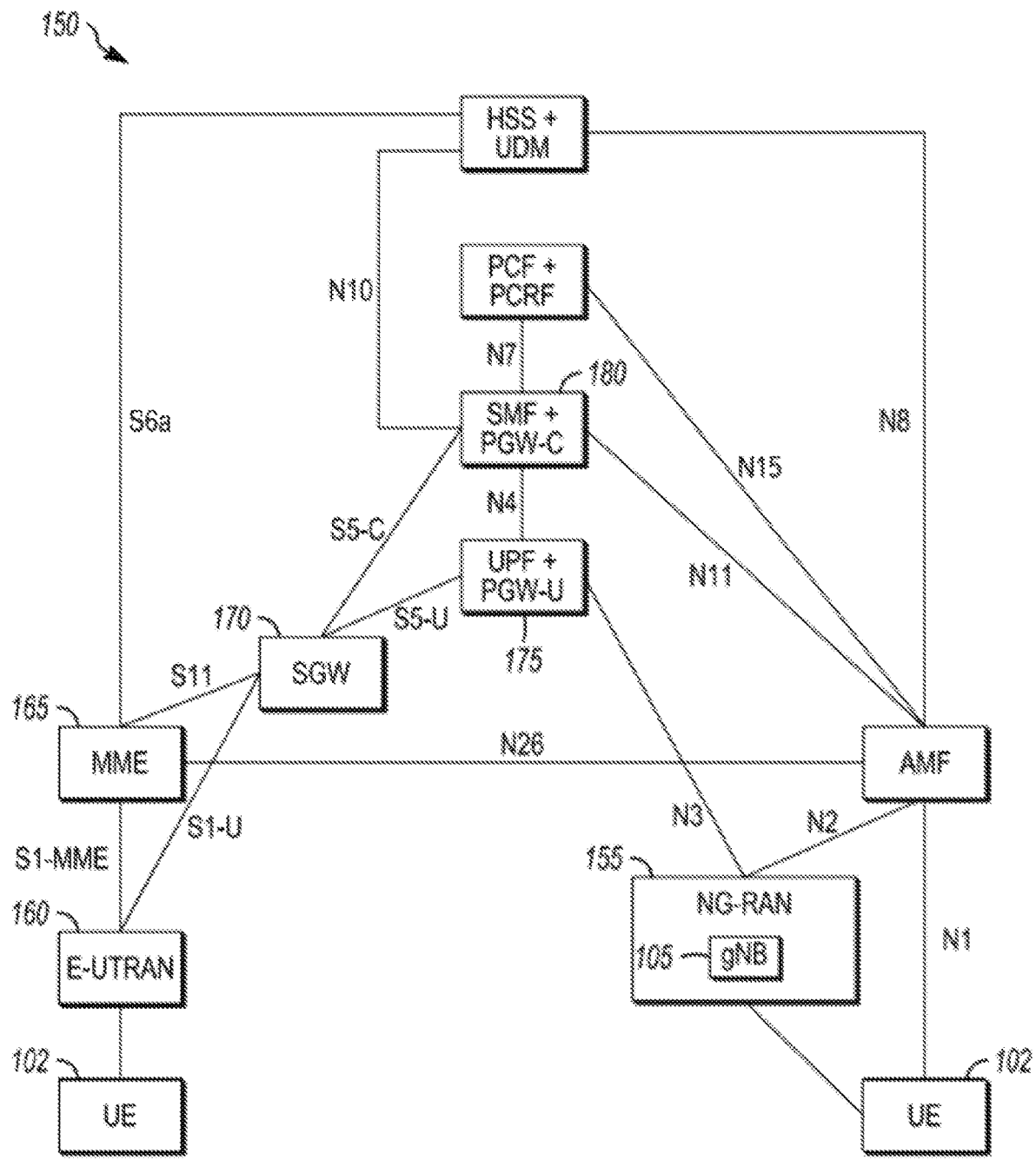
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network. In a non-limiting example, the network 150 may be a new radio (NR) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1A. Some embodiments may not necessarily include all components shown in FIG. 1A, and some embodiments may include additional components not shown in FIG. 1A. In some embodiments, a network may include one or more components shown in FIG. 1B. Some embodiments may not necessarily include all components shown in FIG. 1B, and some embodiments may include additional components not shown in FIG. 1B. In some embodiments, a network may include one or more components shown in FIG. 1A and one or more components shown in FIG. 1B. In some embodiments, a network may include one or more components shown in FIG. 1A, one or more components shown in FIG. 1B and one or more additional components.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Next Generation Node-B's (gNBs) 105. In some embodiments, one or more eNBs 104 may be configured to operate as gNBs 105. Embodiments are not limited to the number of eNBs 104 shown in FIG. 1A or to the number of gNBs 105 shown in FIG. 1A. In some embodiments, the network 100 may not necessarily include eNBs 104. Embodiments are also not limited to the connectivity of components shown in FIG. 1A.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102, gNBs 105, and/or eNBs 104 may be configured to operate in accordance with an NR protocol and/or NR techniques. References to a UE 102, eNB 104, and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165. The MME 165 may be similar to the MME 122 described herein, although the scope of embodiments is not limited in this respect. The MME 165 may perform one or more operations or functionality similar to those described herein regarding the MME 122, although the scope of embodiments is not limited in this respect.

In some embodiments, the network 150 may include the SGW 170. The SGW 170 may be similar to the SGW 124 described herein, although the scope of embodiments is not limited in this respect. The SGW 170 may perform one or more operations or functionality similar to those described herein regarding the SGW 124, although the scope of embodiments is not limited in this respect.

In some embodiments, the network 150 may include component(s) and/or module(s) for functionality for a user plane function (UPF) and user plane functionality for PGW (PGW-U), as indicated by 175. In some embodiments, the network 150 may include component(s) and/or module(s) for functionality for a session management function (SMF) and control plane functionality for PGW (PGW-C), as indicated by 180. In some embodiments, the component(s) and/or module(s) indicated by 175 and/or 180 may be similar to the PGW 126 described herein, although the scope of embodiments is not limited in this respect. The component(s) and/or module(s) indicated by 175 and/or 180 may perform one or more operations or functionality similar to those described herein regarding the PGW 126, although the scope of embodiments is not limited in this respect. One or both of the components 170, 172 may perform at least a portion of the functionality described herein for the PGW 126, although the scope of embodiments is not limited in this respect.

Embodiments are not limited to the number or type of components shown in FIG. 1B. Embodiments are also not limited to the connectivity of components shown in FIG. 1B.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
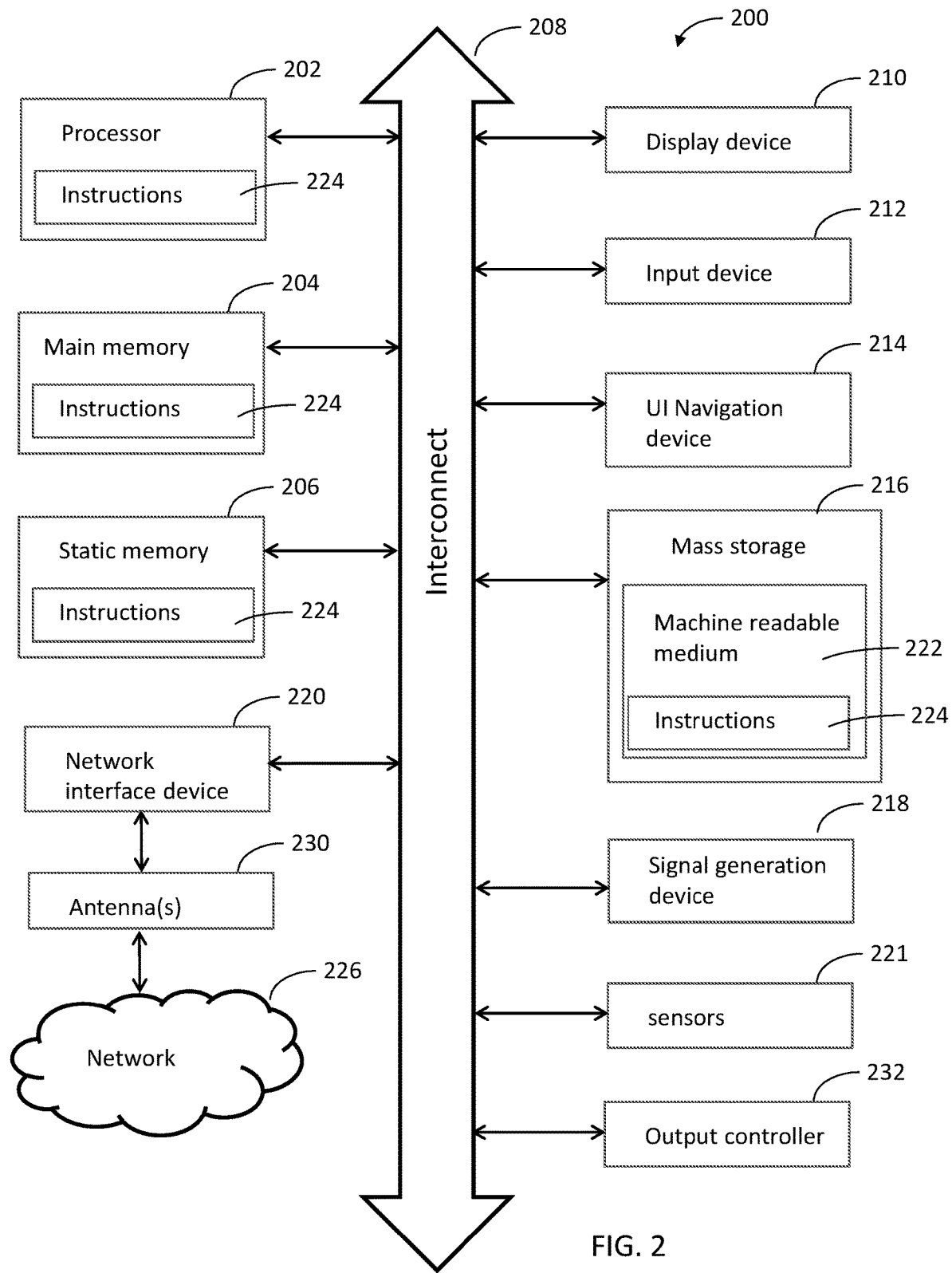
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
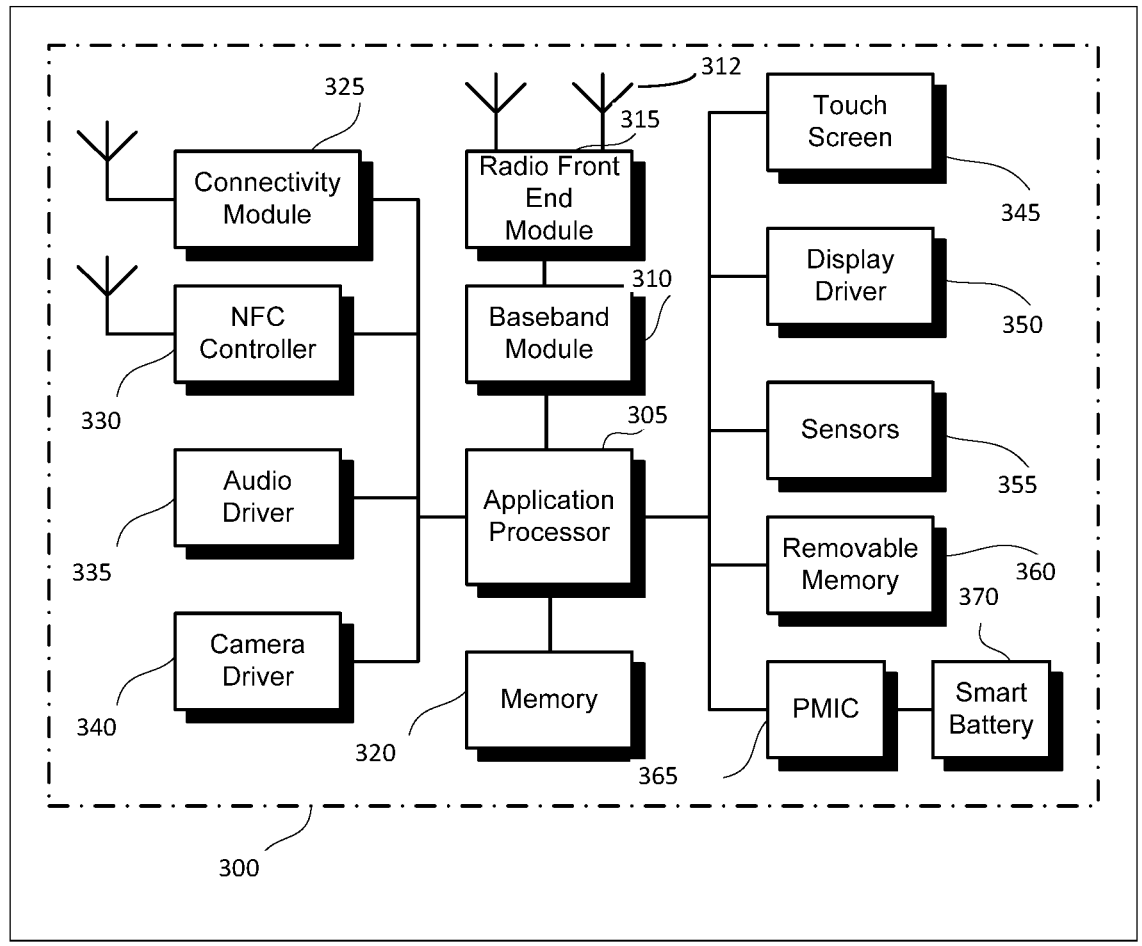
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
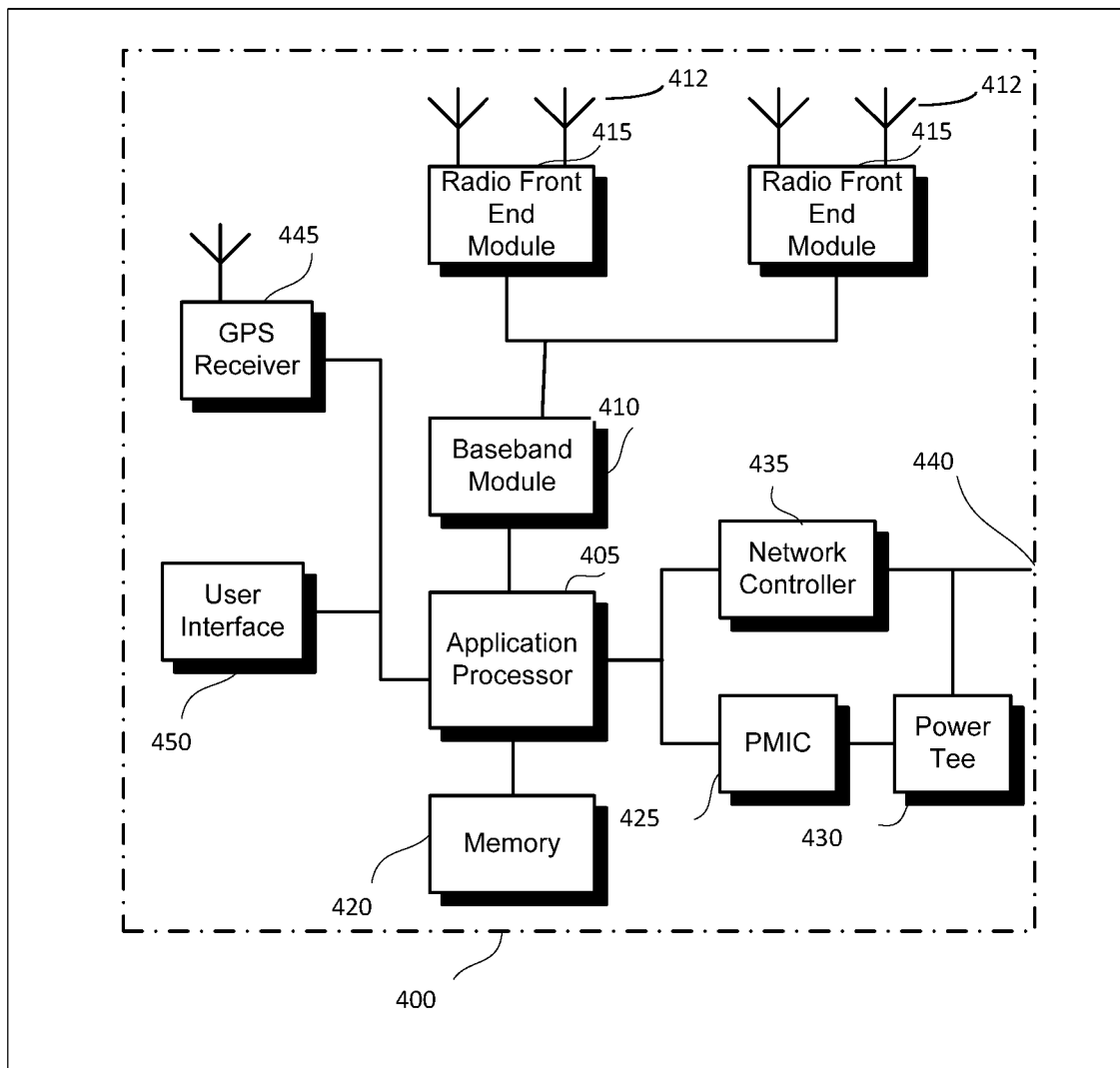
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Next Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with some aspects. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a Next Generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
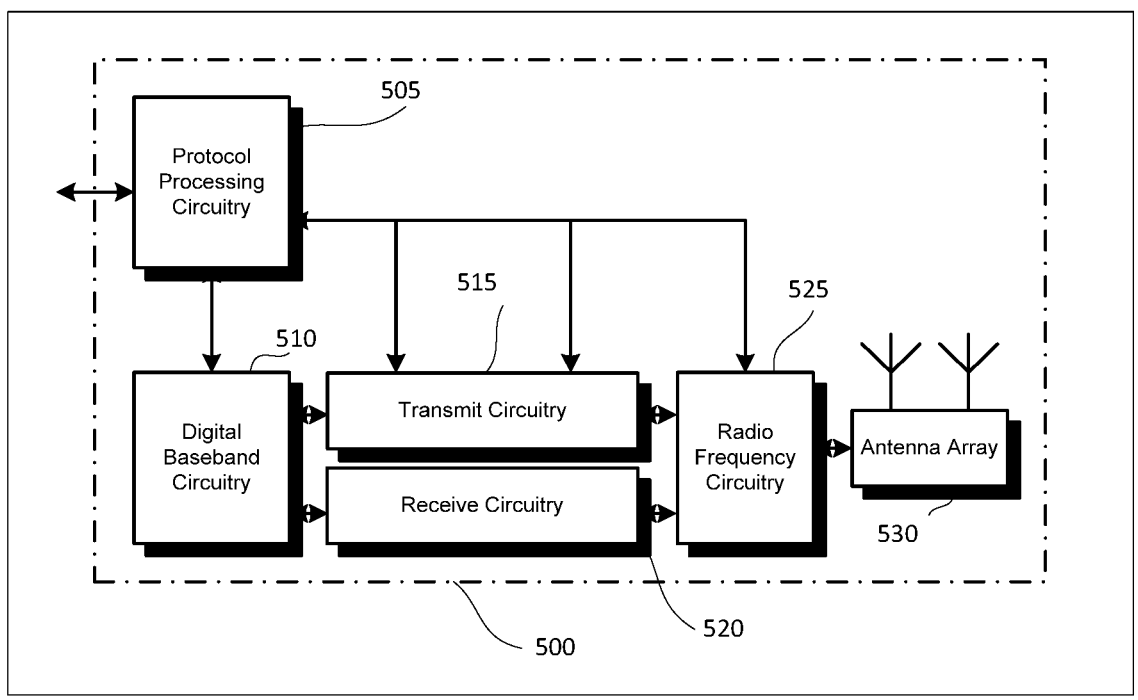
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525.

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
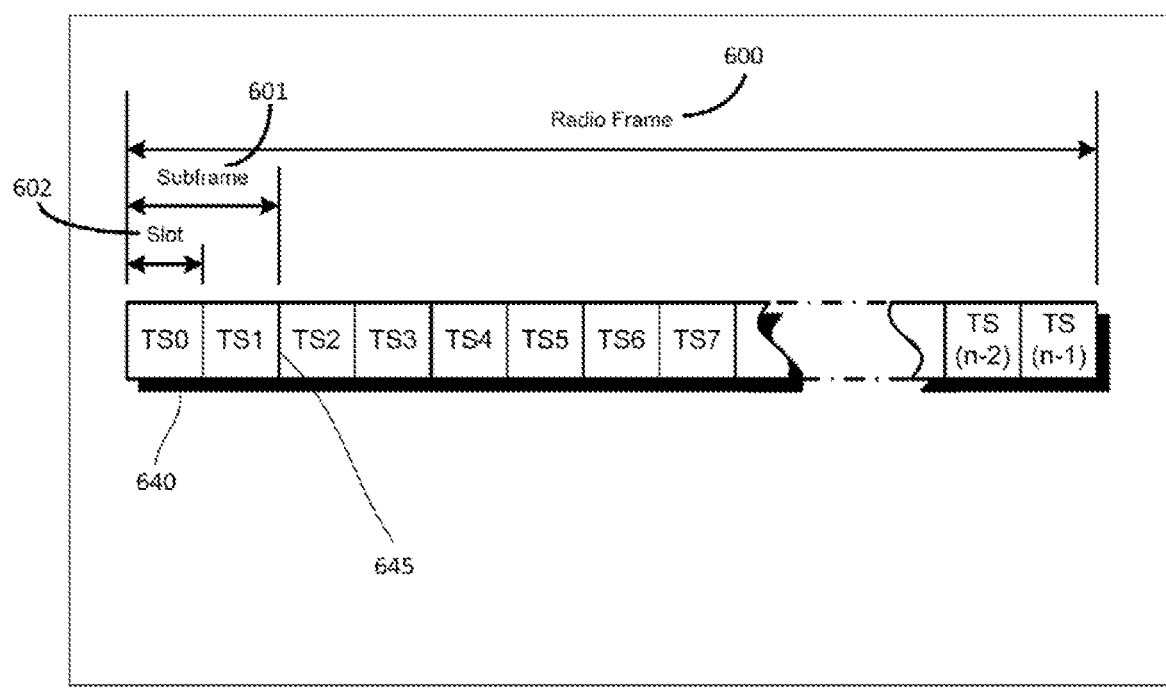
FIG. 6 illustrates an example of a radio frame structure in accordance with some embodiments.
Figure 7:
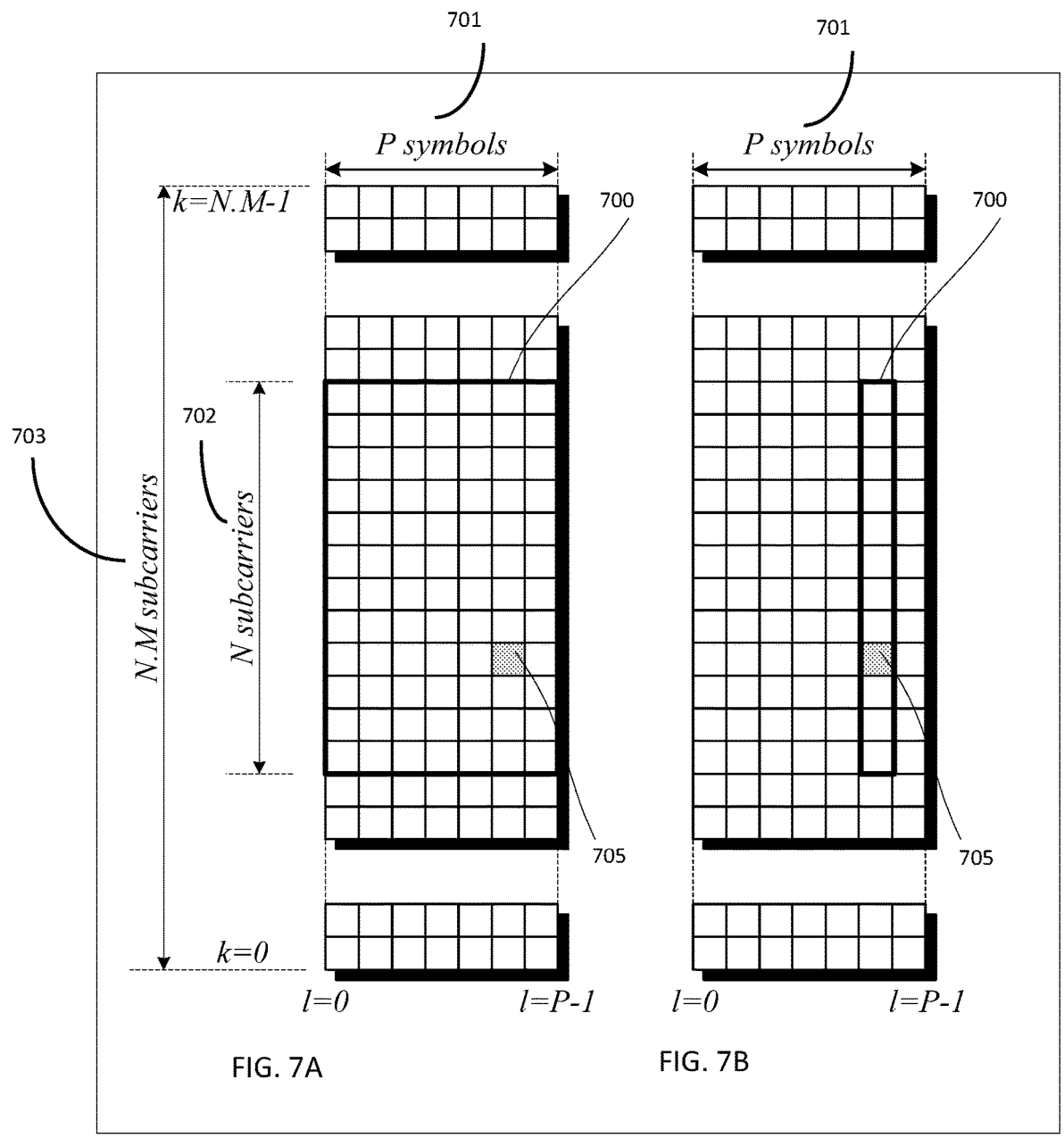
FIG. 7A and FIG. 7B illustrate example frequency resources in accordance with some embodiments.

FIG. 6 illustrates an example of a radio frame structure in accordance with some embodiments. FIGS. 7A and 7B illustrate example frequency resources in accordance with some embodiments. In references herein, "FIG. 7" may include FIG. 7A and FIG. 7B. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

Referring to FIGS. 7A and 7B, in some aspects, a subcomponent of a transmitted signal consisting of one subcarrier in the frequency domain and one symbol interval in the time domain may be termed a resource element. Resource elements may be depicted in a grid form as shown in FIG. 7A and FIG. 7B.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N.M−1 (as indicated by 703), where N is the number of subcarriers in a resource block, and M is the number of resource blocks spanning a component carrier in the frequency domain.

In accordance with some embodiments, an apparatus of a UE 102 may comprise memory. The apparatus may further comprise processing circuitry. The processing circuitry may be configured to, for a channel state information (CSI) report that includes a CSI part 1 transmission and is configurable to include a CSI part 2 transmission, wherein the CSI part 1 transmission is configurable to include one or more fields of a first plurality of fields, wherein the CSI part 2 transmission is configurable to include one or more fields of a second plurality of fields: determine a first number of coded modulation symbols per layer to be used for the CSI part 1 transmission on a physical uplink shared channel (PUSCH) without uplink shared channel (UL-SCH) data. The first number of coded modulation symbols per layer may be determined as: a minimum of a first term and a second term if the CSI report includes the CSI part 2 transmission; and the second term if the CSI report does not include the CSI part 2 transmission. The first term may be based at least partly on a sum of a number of bits for the CSI part 1 transmission and a number of bits for a cyclic redundancy check (CRC) for the CSI part 1 transmission. The second term may be based at least partly on a difference between a number of resource elements (REs) allocated for transmission of uplink control information (UCI) and a number of coded modulation symbols per layer for hybrid automatic repeat request acknowledgement (HARQ-ACK) on the PUSCH. The processing circuitry may be further configured to encode the CSI part 1 transmission in accordance with the first number of coded modulation symbols per layer. These embodiments are described in more detail below.

Figure 8:
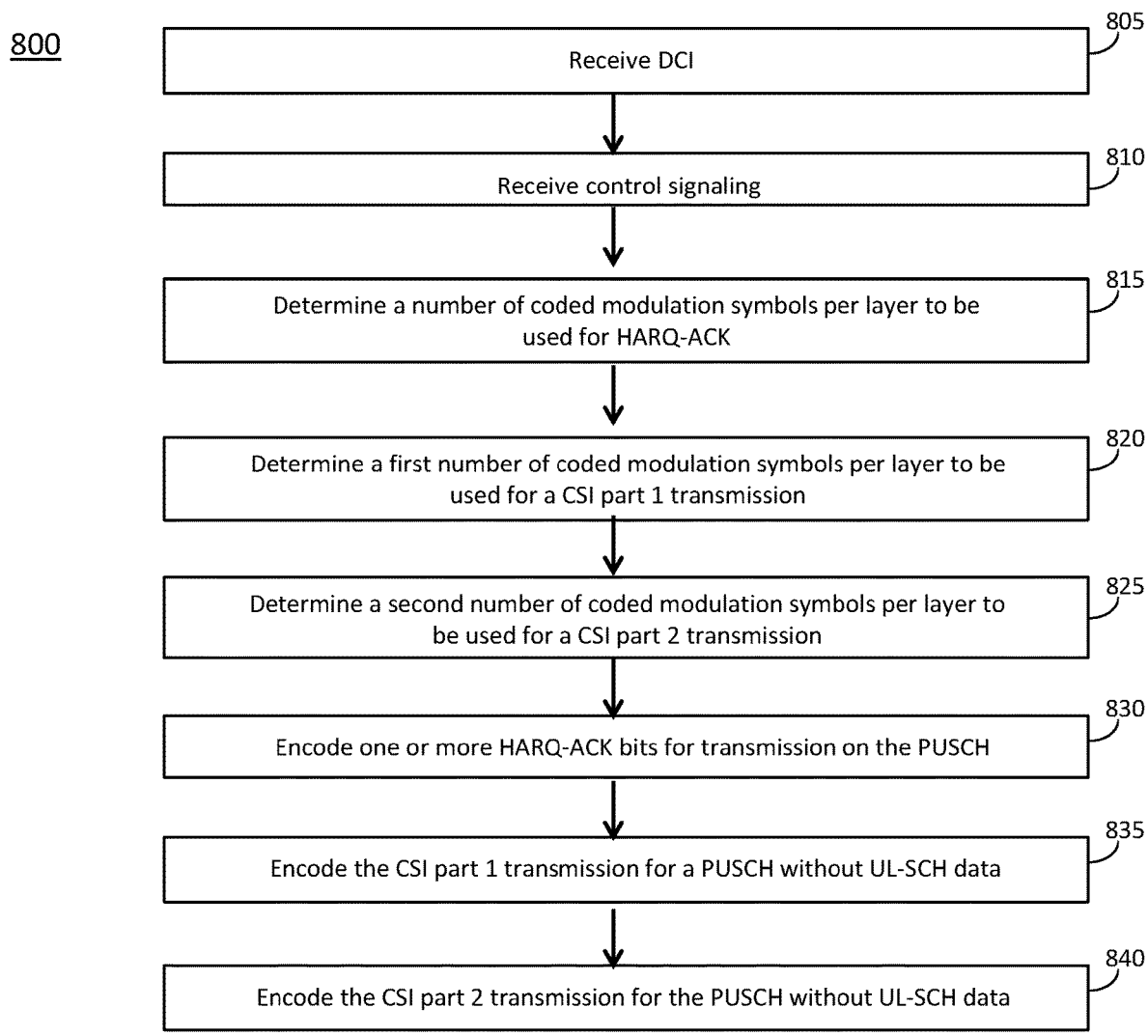
FIG. 8 illustrates the operation of a method of communication in accordance with some embodiments.
Figure 9:
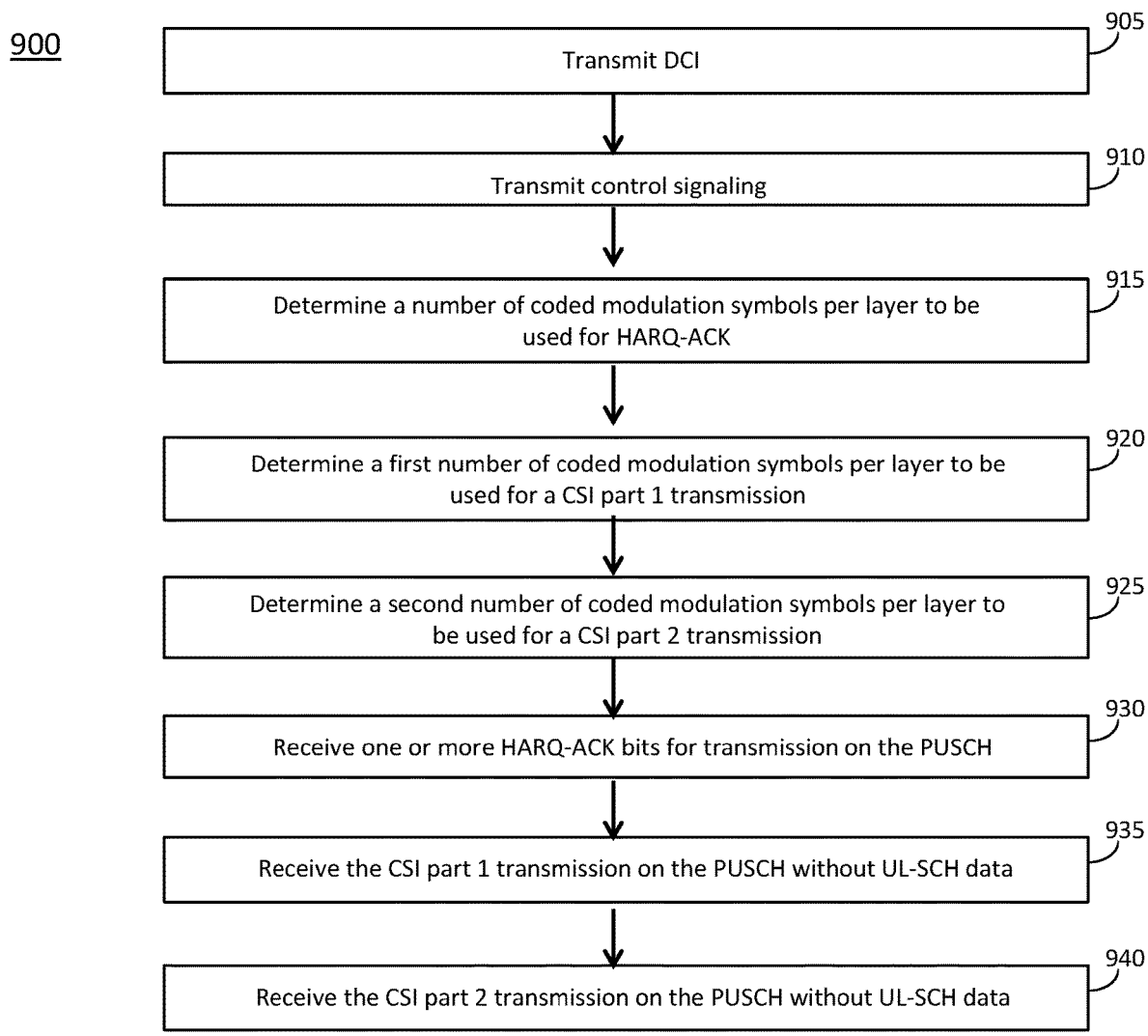
FIG. 9 illustrates the operation of another method of communication in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, a UE 102 may perform one or more operations of the method 800, but embodiments are not limited to performance of the method 800 and/or operations of it by the UE 102. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the gNB 105 may perform an operation that may be the same as, similar to, reciprocal to and/or related to an operation of the method 800, in some embodiments.

In some embodiments, a gNB 105 may perform one or more operations of the method 900, but embodiments are not limited to performance of the method 900 and/or operations of it by the gNB 105. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the UE 102 may perform an operation that may be the same as, similar to, reciprocal to and/or related to an operation of the method 800, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include reception of an element (such as a frame, block, message and/or other) by the UE 102, and an operation of the method 900 may include transmission of a same element (and/or similar element) by the gNB 105. In some cases, descriptions of operations and techniques described as part of one of the methods 800, 900 may be relevant to the other method.

Discussion of various techniques and concepts regarding one of the methods 800, 900 and/or other method may be applicable to one of the other methods, although the scope of embodiments is not limited in this respect. Such technique and concepts may include channel state information (CSI), CSI reports, CSI part 1, CSI part 2, determination of parameters related to the CSI part 1 and/or CSI part 2, downlink control information (DCI), physical uplink shared channel (PUSCH), uplink control information (UCI), reception of such elements, transmission of such elements and/or other.

The methods 800, 900 and other methods described herein may refer to eNBs 104, gNBs 105 and/or UEs 102 operating in accordance with 3GPP standards, 5G standards, NR standards and/or other standards. However, embodiments are not limited to performance of those methods by those components, and may also be performed by other devices, such as a Wi-Fi access point (AP) or user station (STA). In addition, the methods 800, 900 and other methods described herein may be practiced by wireless devices configured to operate in other suitable types of wireless communication systems, including systems configured to operate according to various IEEE standards such as IEEE 802.11. The methods 800, 900 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to Third Generation Partnership Project (3GPP), 3GPP Long Term Evolution (LTE), Fourth Generation (4G), Fifth Generation (5G), New Radio (NR) and/or other. The scope of embodiments is not limited to usage of elements that are included in standards, however.

In some embodiments, the UE 102 may be arranged to operate in accordance with a new radio (NR) protocol. In some embodiments, the gNB 105 may be arranged to operate in accordance with an NR protocol.

At operation 805, the UE 102 may receive downlink control information (DCI). At operation 810, the UE 102 may receive control signaling. At operation 815, the UE 102 may determine a number of coded modulation symbols per layer to be used for hybrid automatic repeat request acknowledgement (HARQ-ACK). At operation 820, the UE 102 may determine a first number of coded modulation symbols per layer to be used for a channel state information (CSI) part 1 transmission of a CSI report. At operation 825, the UE 102 may determine a second number of coded modulation symbols per layer to be used for a CSI part 2 transmission. At operation 830, the UE 102 may encode one or more HARQ-ACK bits for transmission on the PUSCH. In some embodiments, the UE 102 may encode the one or more HARQ-ACK bits for transmission on the PUSCH without uplink shared channel (UL-SCH) data, although the scope of embodiments is not limited in this respect. At operation 835, the UE 102 may encode the CSI part 1 transmission for a PUSCH without UL-SCH data. At operation 840, the UE 102 may encode the CSI part 2 transmission for the PUSCH without UL-SCH data.

In some embodiments, the CSI report may include a CSI part 1 transmission and may be configurable to include a CSI part 2 transmission. In some embodiments, the CSI part 1 transmission may be configurable to include one or more fields of a first plurality of fields. In some embodiments, the CSI part 2 transmission may be configurable to include one or more fields of a second plurality of fields. References to a "first plurality of fields" and a "second plurality of fields" may be used herein for clarity, but such references are not limiting. In some embodiments, the first plurality of fields may be a predetermined plurality of fields, although the scope of embodiments is not limited in this respect. In some embodiments, the second plurality of fields may be a predetermined plurality of fields, although the scope of embodiments is not limited in this respect. In some embodiments, the fields that are included in the second plurality of fields may depend, at least partly, on which fields are included in the first plurality of fields, although the scope of embodiments is not limited in this respect.

In some embodiments, the UE 102 may use any suitable technique to determine whether the CSI part 2 transmission is to be included in the CSI report. In some embodiments, the UE 102 may receive control signaling (such as a DCI, RRC signaling and/or other) from the gNB 105 that indicates whether the CSI part 2 transmission is to be included in the CSI report. In some embodiments, the UE 102 may receive control signaling (such as a DCI, RRC signaling and/or other) from the gNB 105 that indicates which fields of the first plurality of fields and the second plurality of fields are to be sent to the gNB 105 in the CSI report. The UE 102 may determine that the CSI report includes the CSI part 2 transmission if the control signaling indicates that at least one of the fields of the second plurality of fields is to be sent to the gNB 105. Embodiments are not limited to the above techniques, however, as other suitable techniques may be used to determine whether the CSI report is to include the CSI part 2 transmission, in some embodiments.

In some embodiments, the UE 102 may use any suitable technique to determine whether the UE 102 is to transmit the CSI report on the PUSCH without the UL-SCH data. In some embodiments, the UE 102 may receive DCI from the gNB 105, and may determine whether the UE 102 is to transmit the CSI report on the PUSCH without the UL-SCH data based at least partly on one or more of the following, included in the DCI: a frequency domain resource assignment, a time-domain resource assignment, a modulation and coding scheme, a new data indicator, a redundancy version value, a HARQ process number, a CSI request field, a bandwidth part (BWP) indicator, a sounding reference signal (SRS) indicator, precoding information, a number of layers, a phase-tracking reference symbol indicator and/or other element(s). In some embodiments, the UE 102 may determine whether the CSI report includes the CSI part 2 transmission based at least partly on one or more of the above elements.

In some embodiments, the first plurality of fields may include one or more of: a CSI resource indicator (CRI), a rank indicator (RI), a wideband channel quality indicator (CQI) for a first transport block (TB) and/or other field(s). Embodiments are not limited to the fields described above, as the CSI part 1 may include any suitable fields, including but not limited one or more of the above.

In some embodiments, the second plurality of fields may include one or more of: a precoding matrix indicator (PMI), a wideband CQI for a second TB and/or other field(s). Embodiments are not limited to the fields described above, as the CSI part 2 may include any suitable fields, including but not limited one or more of the above.

Various techniques may be used to determine the first number of coded modulation symbols per layer and/or the second number of coded modulation symbols per layer. In some embodiments, one or more of the techniques described below may be used. In some embodiments, one or more techniques that may be similar to one or more of the techniques described below may be used. For instance, embodiments are not limited to usage of numbers (like 11, 360 and/or other) in the descriptions below, as other numbers may be used. In descriptions below, terminology such as "first term," "second term," "first sub-term," "second sub-term," "third sub-term," and/or other may be used for clarity, but such references are not limiting.

In some embodiments, the UE 102 may determine a first number of coded modulation symbols per layer to be used for the CSI part 1 transmission on a PUSCH without uplink shared channel (UL-SCH) data, as: a minimum of a first term and a second term if the CSI report includes the CSI part 2 transmission; and the second term if the CSI report does not include the CSI part 2 transmission. The first term may be based at least partly on a sum of a number of bits for the CSI part 1 transmission and a number of bits for a cyclic redundancy check (CRC) for the CSI part 1 transmission. The second term may be based at least partly on a difference between a number of resource elements (REs) allocated for transmission of uplink control information (UCI) and a number of coded modulation symbols per layer for hybrid automatic repeat request acknowledgement (HARQ-ACK) on the PUSCH.

In some embodiments, first term may be based on a ceiling function applied to a product of a first sub-term and a second sub-term divided by a third sub-term. The first sub-term may be based on a sum of the number of bits for the CSI part 1 transmission, and a number that is equal to: 11, if the number of bits for the CSI part 1 transmission is greater than or equal to 360; or the number of bits for the CRC for the CSI part 1 transmission, if the number of bits for the CSI part 1 transmission is less than 360. The second sub-term may be based on a beta offset parameter for the PUSCH. The third sub-term may be based on a product of: a code rate for the PUSCH, and a modulation order of the PUSCH.

In some embodiments, the UE 102 may, if the CSI report includes the CSI part 2 transmission, determine a second number of coded modulation symbols per layer to be used for the CSI part 2 transmission on the PUSCH without the UL-SCH data, as: a difference between the second term and the first number of coded modulation symbols per layer.

In some embodiments, the second term may be based on a difference between: a sum, for a number of symbols of the PUSCH, of a number of REs allocated for transmission of the UCI in each symbol; and a number (wherein the number may be equal to: the number of coded modulation symbols per layer for the HARQ-ACK on the PUSCH.

In some embodiments, the UE 102 may receive, from the gNB 105, DCI that includes an uplink grant that indicates a code rate for the PUSCH and a modulation order for the PUSCH. The UE 102 may determine the first number of coded modulation symbols per layer (and/or other elements) based at least partly on the code rate for the PUSCH and the modulation order for the PUSCH In some embodiments, the UE 102 may determine the first number of coded modulation symbols per layer (and/or other elements) based on a remaining number of REs, from the REs allocated for transmission of the UCI, that are not used for HARQ-ACK transmission on the PUSCH.

In some embodiments, the UE 102 may encode, in accordance with the first number of coded modulation symbols per layer, the CSI part 1 transmission. In some embodiments, the UE 102 may, if the CSI report is to include the CSI part 2: encode, in accordance with the second number of coded modulation symbols per layer, the CSI part 2 transmission.

In some embodiments, for CSI part 1 transmission on PUSCH without UL-SCH, the number of coded modulation symbols per layer for CSI part 1 transmission, denoted as $Q'_{CSI\text{-}part1}$, may be determined as follows.

If there is CSI part 2 to be transmitted on the PUSCH, $$Q'_{CSI-1} = \min\left\{\left\lceil\frac{(O_{CSI-1} + L_{CSI-1}) \cdot \beta^{PUSCH}_{offset}}{R \cdot Q_m}\right\rceil, \sum_{l=0}^{N^{PUSCH}_{symb,all}-1} M^{UCI}_{sc}(l) - Q'_{ACK}\right\}$$

Else, $$Q'_{CSI-1} = \sum_{l=0}^{N^{PUSCH}_{symb,all}-1} M^{UCI}_{sc}(l) - Q'_{ACK}$$

The $O_{CSI-1}$ is the number of bits for CSI part 1; —if $O_{CSI-1} \geq 360$, $L_{CSI-1} = 11$; otherwise $L_{CSI-1}$ is the number of CRC bits for CSI part 1 determined according to Subclause 6.3.1.2.1 of TS 38.212; $\beta^{PUSCH}_{offset} = \beta^{CSI-part1}_{offset}$; $M^{PUSCH}_{sc}$ is the scheduled bandwidth of the PUSCH transmission, expressed as a number of subcarriers; —$M^{PT-RS}_{sc}(l)$ is the number of subcarriers in OFDM symbol l that carries PTRS, in the PUSCH transmission; $Q'_{ACK}$ is the number of coded modulation symbols per layer for HARQ-ACK transmitted on the PUSCH if number of HARQ-ACK information bits is more than 2. Furthermore, $$Q'_{ACK} = \sum_{l=0}^{N^{PUSCH}_{sumb,all}-1} \overline{M}^{ACK}_{sc,rvd}(l)$$

if the number of HARQ-ACK information bits is no more than 2 bits, where $\overline{M}^{ACK}_{sc,rsd}(l)$ is the number of reserved resource elements for potential HARQ-ACK transmission in OFDM symbol l, for l=0, 1, 2, . . . , $N^{PUSCH}_{symb,all}-1$, in the PUSCH transmission, defined in Subclause 6.2.7 of TS 38.212; $M^{UCI}_{sc}(l)$ is the number of resource elements that can be used for transmission of UCI in OFDM symbol l, for l=0, 1, 2, . . . , $N^{PUSCH}_{symb,all}-1$, in the PUSCH transmission and $N^{PUSCH}_{symb,all}$ is the total number of OFDM symbols of the PUSCH, including all OFDM symbols used for DMRS; for any OFDM symbol that carries DMRS of the PUSCH, $M_{sc}^{UCI}(l)=0$; for any OFDM symbol that does not carry DMRS of the PUSCH, $M_{sc}^{UCI}(l)=M_{sc}^{PUSCH}-M_{sc}^{PT-RS}(l)$; R is the code rate of the PUSCH, determined according to Subclause 6.1.4.1 of [6, TS38.212]; $Q_m$ is the modulation order of the PUSCH.

It should be noted that embodiments are not limited to usage of the exact parameters, values and/or formulas given above. In some embodiments, the number of coded modulation symbols per layer for CSI part 1 transmission may be determined using: one or more similar parameters, one or more other parameters, one or more similar values, one or more other values, one or more similar formulas, one or more other formulas and/or other element(s).

In some embodiments, for CSI part 2 transmission on PUSCH without UL-SCH, the number of coded modulation symbols per layer for CSI part 2 transmission, denoted as $Q'_{CSI-part2}$, may be determined as follows.

$$Q'_{CSI-2} = \sum_{l=0}^{N_{symb,all}^{PUSCH}-1} M_{sc}^{UCI}(l) - Q'_{ACK} - Q'_{CSI-1}$$

The parameter $M_{sc}^{PUSCH}$ is the scheduled bandwidth of the PUSCH transmission, expressed as a number of subcarriers; $M_{sc}^{PT-RS}(l)$ is the number of subcarriers in OFDM symbol l that carries PTRS, in the PUSCH transmission; $Q'_{ACK}$ is the number of coded modulation symbols per layer for HARQ-ACK transmitted on the PUSCH if number of HARQ-ACK information bits is more than 2, and $Q'_{ACK}=0$ if the number of HARQ-ACK information bits is 1 or 2 bits; $Q'_{CSI-1}$ is the number of coded modulation symbols per layer for CSI part 1 transmitted on the PUSCH; $M_{sc}^{UCI}(l)$ is the number of resource elements that can be used for transmission of UCI in OFDM symbol l, for l=0, 1, 2, ..., $N_{symb,all}^{PUSCH}-1$, in the PUSCH transmission and $N_{symb,all}^{PUSCH}$ is the total number of OFDM symbols of the PUSCH, including all OFDM symbols used for DMRS; for any OFDM symbol that carries DMRS of the PUSCH, $M_{sc}^{UCI}(l)=0$; for any OFDM symbol that does not carry DMRS of the PUSCH, $M_{sc}^{UCI}(l)=M_{sc}^{PUSCH}-M_{sc}^{PT-RS}(l)$.

In should be noted that embodiments are not limited to usage of the exact parameters, values and/or formulas given above. In some embodiments, the number of coded modulation symbols per layer for CSI part 2 transmission may be determined using: one or more similar parameters, one or more other parameters, one or more similar values, one or more other values, one or more similar formulas, one or more other formulas and/or other element(s).

In some embodiments, an even number of REs for a UCI may be used. In some cases, a UCI type may be segmented into multiple codewords, such as when Polar coding is applied and the payload size and/or the coded bits exceed certain threshold values. In such cases, the number of REs per segment may be different. The coded bits corresponding to each segment may be interleaved separately, with each potentially using a different interleaver length (for instance, a triangular interleaver may be used). The interleaving operation may become simplified if the number of resource elements (REs) per segment can be made even. This may allow a simple parallelized interleaving operation, in some embodiments. This may be achieved by the following formula (shown for the case in which the CSI part 1 and the CSI part 2 are present on PUSCH without UL-SCH), by a similar formula and/or by another formula. It should be noted that the first term in the min operation always yields an even number. A same modification and/or similar modification may be applied to one or more other scenarios, in some embodiments. It should be further noted that the technique described above may also ensure that the second term in the "min" operation is even, which may provide one or more benefits in some cases, including cases that include interleaving. In some embodiments, if a number of segments is larger than 2 (e.g. C), then the formula may be amended to ensure each segment has same number of resource elements.

$$Q'_{CSI,1} = \min\left\{2 \cdot \left\lceil \frac{(O_{CSI,1}+L) \cdot M_{sc}^{PUSCH} \cdot N_{sc}^{PUSCH} \cdot N_{symb}^{PUSCH} \cdot \beta_{offset}^{PUSCH}}{2 \cdot O_{CSI,2-ref}} \right\rceil, \sum_{l=0}^{N_{symb,all}^{PUSCH}-1} M_{sc}^{\Phi^{UCI}}(l) \right\}$$

It should be noted that embodiments are not limited to usage of the exact parameters, values and/or formulas given above. In some embodiments, the number of coded modulation symbols per layer for CSI part 1 transmission may be determined using: one or more similar parameters, one or more other parameters, one or more similar values, one or more other values, one or more similar formulas, one or more other formulas and/or other element(s).

In some embodiments, an apparatus of a UE 102 may comprise memory. The memory may be configurable to store information related to the first number of coded modulation symbols per layer. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to determination of the first number of coded modulation symbols per layer. The apparatus may include a transceiver to transmit the CSI part 1. The transceiver may transmit and/or receive other blocks, messages and/or other elements.

At operation 905, the gNB 105 may transmit downlink control information (DCI). At operation 910, the the gNB 105 may transmit control signaling. At operation 915, the gNB 105 may determine a number of coded modulation symbols per layer to be used for HARQ-ACK. At operation 920, the gNB 105 may determine a first number of coded modulation symbols per layer to be used for a CSI part 1 transmission of a CSI report. At operation 925, the gNB 105 may determine a second number of coded modulation symbols per layer to be used for a CSI part 2 transmission. At operation 930, the gNB 105 may receive one or more HARQ-ACK bits on the PUSCH. In some embodiments, the gNB 105 may receive one the one or more HARQ-ACK bits on the PUSCH without UL-SCH data, although the scope of embodiments is not limited in this respect. At operation 935, the gNB 105 may receive the CSI part 1 transmission on a PUSCH without UL-SCH data. At operation 940, the gNB 105 may receive the CSI part 2 transmission on the PUSCH without UL-SCH data.

In some embodiments, the gNB 105 may transmit DCI that may be the same as and/or similar to DCI described regarding the method 800, although the scope of embodiments is not limited in this respect. In some embodiments, the gNB 105 may transmit control signaling that may be the same as and/or similar to control signaling described regarding the method 800, although the scope of embodiments is not limited in this respect.

In some embodiments, an apparatus of a gNB 105 may comprise memory. The memory may be configurable to store information related to the first number of coded modulation symbols per layer. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to determination of the first number of coded modulation symbols per layer. The apparatus may include a transceiver to receive the CSI part 1. The transceiver may transmit and/or receive other blocks, messages and/or other elements.

In Example 1, an apparatus of a User Equipment (UE) may comprise memory. The apparatus may further comprise processing circuitry. The processing circuitry may be configured to, for a channel state information (CSI) report that includes a CSI part 1 transmission and is configurable to include a CSI part 2 transmission, wherein the CSI part 1 transmission is configurable to include one or more fields of a first plurality of fields, wherein the CSI part 2 transmission is configurable to include one or more fields of a second plurality of fields: determine a first number of coded modulation symbols per layer to be used for the CSI part 1 transmission on a physical uplink shared channel (PUSCH) without uplink shared channel (UL-SCH) data. The first number of coded modulation symbols per layer to be used for the CSI part 1 transmission on the PUSCH without UL-SCH data may be determined as: a minimum of a first term and a second term if the CSI report includes the CSI part 2 transmission; and the second term if the CSI report does not include the CSI part 2 transmission. The first term may be based at least partly on a sum of a number of bits for the CSI part 1 transmission and a number of bits for a cyclic redundancy check (CRC) for the CSI part 1 transmission. The second term may be based at least partly on a difference between a number of resource elements (REs) allocated for transmission of uplink control information (UCI) and a number of coded modulation symbols per layer for hybrid automatic repeat request acknowledgement (HARQ-ACK) on the PUSCH. The processing circuitry may be further configured to encode the CSI part 1 transmission in accordance with the first number of coded modulation symbols per layer.

In Example 2, the subject matter of Example 1, wherein the processing circuitry may be further configured to, if the CSI report includes the CSI part 2 transmission: determine a second number of coded modulation symbols per layer to be used for the CSI part 2 transmission on the PUSCH without the UL-SCH data, as a difference between the second term and the first number of coded modulation symbols per layer; and encode the CSI part 2 transmission in accordance with the second number of coded modulation symbols per layer.

In Example 3, the subject matter of one or any combination of Examples 1-2, wherein the processing circuitry may be further configured to determine the first number of coded modulation symbols per layer based on a remaining number of REs, from the REs allocated for transmission of the UCI, that are not used for HARQ-ACK transmission on the PUSCH.

In Example 4, the subject matter of one or any combination of Examples 1-3, wherein the first plurality of fields may include one or more of: a CSI resource indicator (CRI), a rank indicator (RI), and a wideband channel quality indicator (CQI) for a first transport block (TB).

In Example 5, the subject matter of one or any combination of Examples 1-4, wherein the second plurality of fields may include one or more of: a precoding matrix indicator (PMI), and a wideband CQI for a second TB.

In Example 6, the subject matter of one or any combination of Examples 1-5, wherein the first term may be based on a ceiling function applied to a product of a first sub-term and a second sub-term divided by a third sub-term. The first sub-term may be based on a sum of the number of bits for the CSI part 1 transmission, and a number that is equal to: 11, if the number of bits for the CSI part 1 transmission is greater than or equal to 360, or the number of bits for the CRC for the CSI part 1 transmission, if the number of bits for the CSI part 1 transmission is less than 360. The second sub-term may be based on a beta offset parameter for the PUSCH. The third sub-term may be based on a product of: a code rate for the PUSCH, and a modulation order of the PUSCH.

In Example 7, the subject matter of one or any combination of Examples 1-6, wherein the second term may be based on a difference between: a sum, for a number of symbols of the PUSCH, of a number of REs allocated for transmission of the UCI in each symbol; and the number of coded modulation symbols per layer for the HARQ-ACK on the PUSCH.

In Example 8, the subject matter of one or any combination of Examples 1-7, wherein the processing circuitry may be further configured to determine the number of coded modulation symbols per layer for HARQ-ACK on the PUSCH. The processing circuitry may be further configured to encode one or more HARQ-ACK bits for transmission on the PUSCH.

In Example 9, the subject matter of one or any combination of Examples 1-8, wherein the processing circuitry may be further configured to decode downlink control information (DCI) that includes an uplink grant that indicates a code rate for the PUSCH and a modulation order for the PUSCH. The processing circuitry may be further configured to determine the first number of coded modulation symbols per layer based at least partly on the code rate for the PUSCH and the modulation order for the PUSCH.

In Example 10, the subject matter of one or any combination of Examples 1-9, wherein the processing circuitry may be further configured to decode control signaling from a Next Generation Node-B (gNB) that indicates which fields of the first plurality of fields and the second plurality of fields are to be sent to the gNB. The processing circuitry may be further configured to determine that the CSI report includes the CSI part 2 transmission if the control signaling indicates that at least one of the fields of the second plurality of fields is to be sent to the gNB.

In Example 11, the subject matter of one or any combination of Examples 1-10, wherein the processing circuitry may be further configured to decode downlink control information (DCI). The processing circuitry may be further configured to determine whether the UE is to transmit the CSI report on the PUSCH without the UL-SCH data based at least partly on one or more of the following, included in the DCI: a frequency domain resource assignment, a time-domain resource assignment, a modulation and coding scheme, a new data indicator, a redundancy version value, a HARQ process number, a CSI request field, a bandwidth part (BWP) indicator, a sounding reference signal (SRS) indicator, precoding information, a number of layers, and a phase-tracking reference symbol indicator.

In Example 12, the subject matter of one or any combination of Examples 1-11, wherein the UE may be arranged to operate in accordance with a new radio (NR) protocol.

In Example 13, the subject matter of one or any combination of Examples 1-12, wherein the apparatus may include a transceiver to transmit the PUSCH. The processing circuitry may include a baseband processor to encode the CSI part 1 transmission. The memory may be configured to store at least a portion of the CSI part 1 transmission.

In Example 14, a non-transitory computer-readable storage medium may store instructions for execution by processing circuitry of a Next Generation Node-B (gNB). The operations may configure the processing circuitry to encode downlink control information (DCI) that indicates that a User Equipment (UE) is to transmit a channel state information (CSI) report on a physical uplink shared channel (PUSCH) without uplink shared channel (UL-SCH) data. The CSI report may include a CSI part 1 transmission and is configurable to include a CSI part 2 transmission. The operations may further configure the processing circuitry to determine, a first number of coded modulation symbols per layer for the CSI part 1 transmission as: a minimum of a first term and a second term if the CSI report includes the CSI part 2 transmission; and the second term if the CSI report does not include the CSI part 2 transmission. The first term may be based at least partly on a sum of a number of bits for the CSI part 1 transmission and a number of bits for a cyclic redundancy check (CRC) for the CSI part 1 transmission. The second term may be based at least partly on a difference between a number of resource elements (REs) allocated for transmission of uplink control information (UCI) and a number of coded modulation symbols per layer for hybrid automatic repeat request acknowledgement (HARQ-ACK) on the PUSCH.

In Example 15, the subject matter of Example 14, wherein the operations may further configure the processing circuitry to decode the CSI part 1 transmission in accordance with the determined first number of coded modulation symbols per layer.

In Example 16, the subject matter of one or any combination of Examples 14-15, wherein the operations may further configure the processing circuitry to, if the CSI report includes the CSI part 2 transmission, determine a second number of coded modulation symbols for the CSI part 2 transmission on the PUSCH when the PUSCH does not include the UL-SCH data, as: a difference between the second term and the first number of coded modulation symbols per layer.

In Example 17, the subject matter of one or any combination of Examples 14-16, wherein the first term may be based on a ceiling function applied to a product of a first sub-term and a second sub-term divided by a third sub-term. The first sub-term may be based on a sum of: the number of bits for the CSI part 1 transmission, and a number that is equal to: 11, if the number of bits for the CSI part 1 transmission is greater than or equal to 360, or the number of bits for the CRC for the CSI part 1 transmission, if the number of bits for the CSI part 1 transmission is less than 360. The second sub-term may be based on a beta offset parameter for the PUSCH. The third sub-term may be based on a product of: a code rate for the PUSCH, and a modulation order of the PUSCH.

In Example 18, the subject matter of one or any combination of Examples 14-17, wherein the second term may be based on a difference between: a sum, for a number of symbols of the PUSCH, of a number of REs allocated for transmission of the UCI in each symbol; and the number of coded modulation symbols per layer for HARQ on the PUSCH.

In Example 19, an apparatus of a User Equipment (UE) may comprise memory. The apparatus may further comprise processing circuitry. The processing circuitry may be configured to decode, from a Next Generation Node-B (gNB), control signaling that indicates, for a channel state information (CSI) report to be transmitted on a physical uplink shared channel (PUSCH) without uplink shared (UL-SCH) data, wherein the CSI report includes a CSI part 1 transmission and is configurable to include a CSI part 2 transmission, whether the CSI report is to include the CSI part 2 transmission. The processing circuitry may be further configured to determine a first number of coded modulation symbols per layer for the CSI part 1 transmission based at least partly on one or more of: a sum of a number of bits for the CSI part 1 transmission and a number of bits for a cyclic redundancy check (CRC) for the CSI part 1 transmission; and a difference between a number of resource elements (REs) allocated for transmission of uplink control information (UCI) and a number of coded modulation symbols per layer for hybrid automatic repeat request acknowledgement (HARQ-ACK) on the PUSCH. The processing circuitry may be further configured to, if the CSI report is to include the CSI part 2 transmission, determine a second number of coded modulation symbols per layer for the CSI part 2 transmission based at least partly on a difference between the number of REs allocated for transmission of the UCI and the first number of coded modulation symbols per layer.

In Example 20, the subject matter of Example 19, wherein the processing circuitry may be further configured to encode, in accordance with the first number of coded modulation symbols per layer, the CSI part 1 transmission. The processing circuitry may be further configured to, if the CSI report is to include the CSI part 2: encode, in accordance with the second number of coded modulation symbols per layer, the CSI part 2 transmission.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method, comprising:
by a user equipment (UE):
for a physical uplink shared channel (PUSCH) transmission including a channel state information (CSI) report that includes at least a CSI part 1 transmission:
determining a first number of coded modulation symbols per layer to be used for the CSI part 1 transmission on the PUSCH without uplink shared channel (UL-SCH) data, as:
a first term when the CSI report does not include a CSI part 2 transmission,
wherein the first term is based on a difference between a summation over a total number of PUSCH layers of a number of resource elements (REs) available for transmission of uplink control information (UCI) in the PUSCH transmission and:
  a number of coded modulation symbols per layer for hybrid automatic repeat request acknowledgement (HARQ-ACK) on the PUSCH when a number of HARQ-ACK information bits is more than two, or
  a number of reserved resource elements for potential HARQ-ACK transmission in the PUSCH transmission when the number of HARQ-ACK information bits is less than or equal to two; and
encoding the CSI part 1 transmission in accordance with the first number of coded modulation symbols per layer.

2. The method of claim 1, further comprising:
when the CSI report includes the CSI part 2 transmission:
  determining the first number of coded modulation symbols per layer as a minimum of a second term and the first term, wherein the second term is based at least partly on a sum of a number of bits for the CSI part 1 transmission and a number of bits for a cyclic redundancy check (CRC) for the CSI part 1 transmission;
  determining a second number of coded modulation symbols per layer to be used for the CSI part 2 transmission on the PUSCH without the UL-SCH data, as:
    a difference between the first term and the first number of coded modulation symbols per layer; and
  encoding the CSI part 2 transmission in accordance with the second number of coded modulation symbols per layer.

3. The method of claim 1, wherein the CSI part 1 transmission is configurable to include one or more fields of a first plurality of fields, wherein the first plurality of fields includes one or more of:
  a CSI resource indicator (CRI),
  a rank indicator (RI), and
  a wideband channel quality indicator (CQI) for a first transport block (TB).

4. The method of claim 3, wherein the CSI part 2 transmission is configurable to include one or more fields of a second plurality of fields, wherein the second plurality of fields includes one or more of:
  a precoding matrix indicator (PMI), and
  a wideband CQI for a second TB.

5. The method of claim 1, further comprising:
determining the number of coded modulation symbols per layer for HARQ-ACK on the PUSCH; and
encoding one or more HARQ-ACK bits for transmission on the PUSCH.

6. The method of claim 1, further comprising:
decoding downlink control information (DCI) that includes an uplink grant that indicates a code rate for the PUSCH and a modulation order for the PUSCH; and
determining the first number of coded modulation symbols per layer based at least in part on the code rate for the PUSCH and the modulation order for the PUSCH.

7. The method of claim 1, wherein the CSI part 1 transmission is configurable to include one or more fields of a first plurality of fields, wherein the CSI part 2 transmission is configurable to include one or more fields of a second plurality of fields, wherein the method further comprises:

decoding control signaling from a base station that indicates which fields of the first plurality of fields and the second plurality of fields are to be sent to the base station; and
determining that the CSI report includes the CSI part 2 transmission when the control signaling indicates that at least one of the fields of the second plurality of fields is to be sent to the base station.

8. The method of claim 1, further comprising:
decoding downlink control information (DCI); and
determining whether the UE is to transmit the CSI report on the PUSCH without the UL-SCH data based at least in part on one or more of the fields in the DCI.

9. The method of claim 1, wherein the UE is arranged to operate in accordance with a new radio (NR) protocol.

10. The method of claim 1, further comprising;
transmitting the PUSCH with a transceiver of the UE; and
storing at least a portion of the CSI part 1 transmission in a non-transitory computer-readable memory medium of the UE, wherein the CSI part 1 transmission is encoded with a baseband processor of the UE.

11. A non-transitory computer-readable storage medium that stores instructions executable by processing circuitry of a base station to configure the processing circuitry to:
encode downlink control information (DCI) that indicates that a User Equipment (UE) is to transmit a physical uplink shared channel (PUSCH) transmission including a channel state information (CSI) report without uplink shared channel (UL-SCH) data, wherein the CSI report includes at least a CSI part 1 transmission;
determine a first number of coded modulation symbols per layer for the CSI part 1 transmission as:
  a first term when the CSI report does not include a CSI part 2 transmission,
    wherein the first term is based on a difference between
      a summation over a total number of PUSCH layers of a number of resource elements (REs) available for transmission of uplink control information (UCI) in the PUSCH transmission, and:
      a number of coded modulation symbols per layer for hybrid automatic repeat request acknowledgement (HARQ-ACK) on the PUSCH when the number of HARQ-ACK information bits is more than two, or
      a number of reserved resource elements for potential HARQ-ACK transmission in the PUSCH transmission when the number of HARQ-ACK information bits is not more than two.

12. The non-transitory computer-readable storage medium according to claim 11, wherein the instructions are further executable to configure the processing circuitry to:
  decode the CSI part 1 transmission in accordance with the determined first number of coded modulation symbols per layer.

13. The non-transitory computer-readable storage medium according to claim 12, wherein the instructions are further executable to configure the processing circuitry to:
when the CSI report includes the CSI part 2 transmission:
  determine the first number of coded modulation symbols per layer as a minimum of a second term and the first term, wherein the second term is based at least partly on a sum of a number of bits for the CSI part 1 transmission and a number of bits for a cyclic redundancy check (CRC) for the CSI part 1 transmission;
  determine a second number of coded modulation symbols for the CSI part 2 transmission on the PUSCH when the PUSCH does not include the UL-SCH data, as:

a difference between the first term and the first number of coded modulation symbols per layer.

14. The non-transitory computer-readable storage medium according to claim 11, wherein the instructions are further executable to configure the processing circuitry to:
encode a downlink control information (DCI) that includes an uplink grant that indicates a code rate for the PUSCH and a modulation order for the PUSCH; and
determine the first number of coded modulation symbols per layer based at least in part on the code rate for the PUSCH and the modulation order for the PUSCH.

15. The non-transitory computer-readable storage medium according to claim 11, wherein the instructions are further executable to configure the processing circuitry to:
encode downlink control information (DCI); and
determine whether the UE is to transmit the CSI report on the PUSCH without the UL-SCH data based at least in part on one or more of the fields in the DCI.

16. The non-transitory computer-readable storage medium according to claim 11, wherein the base station is arranged to operate in accordance with a new radio (NR) protocol.

17. The non-transitory computer-readable storage medium according to claim 11, wherein:
the first term is based on a difference between:
a sum, for a number of symbols of the PUSCH, of a number of REs allocated for transmission of the UCI in each symbol, and
the number of coded modulation symbols per layer for HARQ-ACK on the PUSCH.

18. A user equipment (UE), comprising:
memory;
one or more radios; and
processing circuitry, wherein the UE is configured to:
for a physical uplink shared channel (PUSCH) transmission including a channel state information (CSI) report that includes at least a CSI part 1 transmission:
determine a first number of coded modulation symbols per layer to be used for the CSI part 1 transmission on the PUSCH without uplink shared channel (UL-SCH) data, as:
a minimum of a first term and a second term when the CSI report includes a CSI part 2 transmission, wherein the first term is based at least partly on a sum of a number of bits for the CSI part 1 transmission and a number of bits for a cyclic redundancy check (CRC) for the CSI part 1 transmission,
wherein the second term is based on a difference between a summation over a total number of PUSCH layers of a number of resource elements (REs) available for transmission of uplink control information (UCI) in the PUSCH transmission, and:
a number of coded modulation symbols per layer for hybrid automatic repeat request acknowledgement (HARQ-ACK) on the PUSCH when a number of HARQ-ACK information bits is more than two, or
a number of reserved resource elements for potential HARQ-ACK transmission in the PUSCH transmission when the number of HARQ-ACK information bits less than or equal to two; and
encode the CSI part 1 transmission in accordance with the first number of coded modulation symbols per layer.

19. The UE according to claim 18, wherein the UE is further configured to:
when the CSI report includes the CSI part 2 transmission:
determine the first number of coded modulation symbols per layer as a minimum of a second term and the first term, wherein the second term is based at least partly on a sum of a number of bits for the CSI part 1 transmission and a number of bits for a cyclic redundancy check (CRC) for the CSI part 1 transmission;
determine a second number of coded modulation symbols per layer to be used for the CSI part 2 transmission on the PUSCH without the UL-SCH data, as:
a difference between the first term and the first number of coded modulation symbols per layer; and
encode the CSI part 2 transmission in accordance with the second number of coded modulation symbols per layer.

20. The UE according to claim 18, wherein the CSI part 1 transmission is configurable to include one or more fields of a first plurality of fields, wherein the first plurality of fields includes one or more of:
a CSI resource indicator (CRI),
a rank indicator (RI), and
a wideband channel quality indicator (CQI) for a first transport block (TB).

* * * * *